United States Patent
Weinkauf et al.

[11] Patent Number: 5,405,700
[45] Date of Patent: Apr. 11, 1995

[54] EPOXY-POLYKETONE POLYMER COMPOSITE SYSTEM

[75] Inventors: Donald H. Weinkauf, Houston; Carlton E. Ash, Sugarland, both of Tex.

[73] Assignee: Shell Oil Company, Houston, Tex.

[21] Appl. No.: 166,136

[22] Filed: Dec. 13, 1993

[51] Int. Cl.$^6$ ............................................. B32B 27/38
[52] U.S. Cl. .................................... 428/413; 428/420
[58] Field of Search ...................... 428/413, 414, 420

[56] References Cited

U.S. PATENT DOCUMENTS 4,843,144  6/1989  Van Broekhaven et al. ....... 528/392
4,874,661  10/1989  Browne et al. ..................... 428/246

*Primary Examiner*—D. S. Nakarani

[57] ABSTRACT

It is herein disclosed composite systems of epoxies and polyketone polymers having and exhibiting improved interfacial bonding. The invention also relates to a process for producing the epoxies-polyketone polymer composite systems involving reacting the polyketone polymer with at least one suitable multifunctional amine.

6 Claims, No Drawings

EPOXY-POLYKETONE POLYMER COMPOSITE SYSTEM

FIELD OF THE INVENTION

This invention generally relates to polyketone polymers and to epoxy resins. Note particularly, the invention relates to composite systems of epoxies and polyketone polymers having and exhibiting improved interfacial bonding. The invention also relates to a process for producing the epoxies-polyketone polymer composite systems.

BACKGROUND OF THE INVENTION

Thermoplastic/thermoset composite systems are being employed in an increasing number of applications including piping, high pressure gas cylinders, and chemical storage tanks. For these applications, articles are formed from the thermoplastic by extrusion, blow molding, rotomolding, or some other conventional melt processing technique. In a second step, the thermoplastic is wrapped or coated with the thermoset material. Typically, the thermoset is also a composite system containing glass or carbon fibers. The result is a composite structure which can be readily fabricated into a wide variety of shapes and sizes, yet exhibits high strength in combination with the intrinsic properties of the thermoplastic substrate (i.e., impact, chemical and stress crack propagation resistance).

One of the critical design parameters which govern the ultimate properties of the thermoplastic/thermoset composite structure is the strength of the interface between the thermoplastic and thermoset. Strong interfacial bonds have the desirable characteristic of evenly distributing and transferring stress from the thermoplastic to the high modulus thermoset composite. Thus, strong interfacial bonds increase the service pressures and longevity of fabricated parts. It is preferred that the bond be formed at temperatures which do not melt or distort the existing thermoplastic part.

Polyketone polymers are expected to have good compatibility with thermoplastic/thermoset systems such as epoxies. This is particularly true when the epoxy systems are cured with amine curing agents. Polyketone polymers are known to react with primary amine functionalities at temperatures well below the melting point of the polyketone polymer. By using conventional curing conditions around (150° to 180° C.), a primary amine cured epoxy is expected to readily form covalent bonds with the polyketone substrate. It is known that due to steric hinderance, some amine curing agents will more readily bond to polyketone polymers than others.

As previously disclosed, the interfacial strength between the components of a composite system defines the ultimate properties which can be achieved. Yet when applying epoxy systems to a solid polyketone polymer substrate using conventional curing conditions, the interfacial bond is frequently insufficient to achieve the desired mechanical properties of the composite. While many of the curing agents for epoxy systems are capable of covalently bonding to the polyketone substrate, bonding does not occur due to the competitive reactions with the epoxy systems and the attendant decrease in molecular mobility.

However, because of its desirable mechanical, barrier, and chemical resistance properties in combination with the expected bonding propensity, polyketone polymer is a highly desirable material for use in thermoplastic/thermoset composite systems.

SUMMARY OF THE INVENTION

It is a general object of the invention to provide composite structures of polyketone polymers and epoxy resin.

It is a further object of the invention to provide composite structures of polyketone polymers and epoxy resin having and exhibiting excellent interfacial bonding.

It is also an object of the invention to provide a process for producing composite structures of polyketone polymers and epoxy resins having and exhibiting excellent interfacial bonding.

Accordingly, it is now provided a composite structure comprising polyketone polymer and an epoxy resin, produced by reacting the polyketone polymer with at least one suitable multifunctional amine.

The inventive composite structure has and exhibits excellent interfacial bonding, and can be used in applications requiring the desirable properties of polyketone polymer and epoxy resins.

DETAILED DESCRIPTION OF THE INVENTION

The materials useful in practicing this invention include a linear alternating polymer of carbon monoxide and at least one ethylenically unsaturated hydrocarbon (sometimes simply referred to as a polyketone polymer), epoxy resins, at least one multifunctional amine, and other common polymer additives. For instance, fillers, extenders, lubricants, pigments, plasticizers, and other polymeric materials can be added to the compositions to improve or otherwise alter the properties of the compositions. In general, the practice of this invention involves suitably contacting sufficient quantities of the useful material to form the inventive composite system.

The inventive composite comprises polyketone polymer and an epoxy resin. The epoxy resin component of the composition can be any curable resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction.

Suitable epoxy resins include glycidyl ethers prepared by the reaction of epichlorohydrin with a compound containing at least one hydroxyl group carried out under alkaline reaction conditions. The epoxy resin products obtained when the hydroxy group-containing compound is bisphenol-A are represented below by structure I wherein n is zero or a number greater than 0, commonly in the range of from 0 to 10, preferably in the range of from 0 to 2.

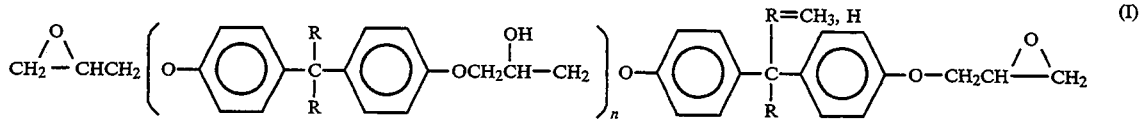

Other suitable epoxy resins can be prepared by the reaction of epichlorohydrin with molecular di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the practice of the invention have a molecular weight generally within the range of from 86 to about 10,000, preferably from about 200 to about 1500. The commercially-available epoxy resin EPON ® Resin 828, a reaction product of epichlorohydrin and 2,2-bis(4-hydroxyphenylpropane (bisphenol-A) having a molecular weight of about 400, an epoxide equivalent (ASTM D-1652) of about 185–192, and an n value (from formula I above) of about 0.2, because of its low viscosity, is the preferred epoxy resin.

The polyketone polymers which are employed as the major component of the oxidatively stabilized polymer composition of the invention are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the composite of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

where G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the $+CO+CH_2-CH_2+$ units and the $-CO+G+$ units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 which is herein incorporated by reference.

The preferential reaction of multifunctional amine molecules with the surface of the polyketone substrate provides a mechanism to covalently bond the polyketone substrate to any epoxy system. Several functional moieties could be used; however, the moieties must be capable of readily reacting with both the polyketone substrate and the epoxy matrix. Multifunctional amine systems have been found to be very effective for this purpose. Many common curing agents for epoxy systems are capable of performing as the multifunctional interfacial bonding agent. These include polymethylene diamines, diethyltriamine (DETA), triethylenetetramine (TETA), aminoethylethanolamine, isophorone diamine, imidazoline, polyether diamines, carbohydrazide, adipic acid dihydrazide, aminoethylpiperazine, and ethylenediamine. Multifunctional amine agents with at least one unhindered alkyl primary amine are preferred especially in instances when the bonding/curing steps must be performed at temperatures below the polyketone melting point which is about 220° C.

The interfacial bond can be achieved in two ways: (1) pretreatment of the substrate (with or without a pre-cure step) or (2) inhibition of the multifunctional amine reaction via adjustment of the epoxy/curing agent stoichiometry and/or catalyst system. In lieu of reformulating the epoxy for optimum adhesion to polyketone polymer, the first method is preferred. Many of the envisioned reformulations to promote adhesion would result in poorer mechanical and chemical resistance properties as well as increased curing times.

The first and preferred method of affecting a strong interfacial bond between epoxy and polyketone involves a pretreatment of the polyketone substrate. Here, the substrate is coated with a solution or a finely divided solid containing at least one multifunctional amine. Once coated, the substrate is heated to an elevated temperature (typically above 100° C.) for a period of time which is sufficient to induce the polyketone polymer/amine reaction. This pretreatment step produces a polyketone polymer surface with bonded moieties having available functionalities which are capable of reacting with the epoxy. The solid/solution can be applied in almost any manner as long as the multifunctional amine is evenly distributed along the polyketone substrate surface.

The time and temperature of the pretreatment step is dependent upon several factors which include the degree of hinderance of the multifunctional amine, the mobility of amine and polyketone substrate, and the presence of catalyst systems. Non-branched, aliphatic primary amines exhibit a sufficient degree of reaction with the solid polyketone substrate at temperatures above 100° C. Less reactive, more hindered amine functionalities require longer periods of time and/or higher temperature to induce a sufficient degree of reaction.

As with any chemical reaction, several catalyst systems could be envisioned which would accelerate the rate of reaction to reduce the time/temperature requirements of the pretreatment step. A general class of catalyst systems include weak acids and bases.

The pretreatment reaction can also be accelerated by using a solvent carrier for the amine functionalized system which partially swells and plasticizers the polyketone surface. The plasticized polyketone molecules have a higher degree of mobility which would facilitate the reaction of the amine system. Swelling solvents for the polyketone include strong hydrogen bonding systems such as phenolics, alcohols, glycols, partially halogenated hydrocarbons, and the conventional aprotic solvents such as n-methyl pyrrolidone. However, non-aqueous solvents are preferred.

After the pretreatment, the polyketone polymer/epoxy interfacial bond is developed during the conventional cure cycle for the epoxy. During this process, the remaining functionality of the molecules bonded to the polyketone surface become integrated into the epoxy network via any number of known epoxide reactions. The recommended curing cycle for the epoxy resin system is that which is sufficient to promote reaction and bonding with the modified polyketone substrate.

It is also possible to achieve the interfacial bond without the elevated temperature pretreatment step. In this instance, the epoxy resin is simply applied over the unreacted amine solid/solution on the polyketone substrate. In such a case, the interfacial bond is actuated during the conventional curing protocol for the epoxy resin.

The second method to achieve the strong interfacial bond involves inhibiting the rapid consumption of curing agent from the reaction with the epoxy during the cure step. This can be accomplished by (1) using an imbalanced epoxy/multifunctional amine stoichiometry which favors the amount of multifunctional amine in the system, and/or (2) employing a less effective catalyst system. In both cases, the potential for a reaction of the multifunctional amine with the polyketone substrate during a conventional curing protocol would be improved. However, the reformulation of these resins for optimal adhesion performance may in turn have detrimental effects on the ultimate mechanical and chemical resistance properties of the cured system.

EXAMPLES

The invention is further illustrated by the following non-limiting examples and table.

The invention was demonstrated by comparing the adhesive strength of epoxy-polyketone bond both with and without the pretreatment of the polymer surface. The pretreatment was executed by applying an isophorene diamine curing agent to the surfaces of injection molded plaques made from polyketone. The isophorene diamine was applied as a thin coating using a towelette saturated with the liquid diamine. The coated and control plaques were then placed in a nitrogen purged oven for 1 hour at 120° C. After removal from the oven, the treated and untreated plaques were bonded together using the conventional epoxy system. The epoxy system used was EPON ® 828 with an isophorone diamine curing agent used at 23 phr. The cure cycle was as follows: 1 hour at 120° C. and 1 hour at 160° C. After curing, the plaques were cut to form lap shear specimens using the procedure described in ASTM D1002 with a crosshead speed of 0.05 in/min.

TABLE 1

Lap shear strength of epoxy/polyketone polymer bond with pretreated and untreated polyketone substrates.

| Sample | Lap Shear Strength (psi) |
|---|---|
| Untreated (828/Isophorene-Diamine) | 465 |
| Pretreated (828/Isophorene-Diamine) | >900 |

As shown in Table 1, the lap shear strength of the pretreated materials significantly exceeds that of the untreated materials. The lap shear strength of the values encompassed in this invention are >900 psi. This is nearly twice as high as the lap shear strength of the samples cured with the same epoxy, but without the pretreatment. In this test, the lap shear strength of the pretreated polyketone/epoxy bonded systems exceeded the strength of the polyketone substrate. In all cases, the polyketone test specimen failed before the ultimate lap shear strength of the bond could be attained. It is expected that the actual bond strength of the pretreated specimens is much higher than 900 psi.

While this invention has been described in detail for the purpose of illustration, it is not to be construed as limited thereby but is intended to cover all changes and modifications within the spirit and scope thereof.

What is claimed is:

1. A composite comprising a substrate having at least one surface to which a multifunctional amine is covalently bonded, and an epoxy resin layer bonded to said substrate surface through said multifunctional amine, wherein the substrate comprises a copolymer of carbon monoxide and at least one ethylenically unsaturated hydrocarbon.

2. A composite as in claim 1 wherein said epoxy resin is a glycidyl based on the reaction of epichlorohydrin and bisphenol A.

3. A composite as in claim 1 produced by reacting the substrate surface with a multifunctional amine, prior to bonding said substrate surface with said epoxy resin.

4. A composite as in claim 3 where said multifunctional amine is selected from the group consisting of polymethylene diamines, diethyltriamine, triethylenetetramine, aminoethylethanolamine, isophorone diamine, imidazoline, polyether diamines, carbohydrazide, adipic acid dihydrazide, aminoethylpiperazine, and ethylenediamine.

5. A composite as in claim 3 wherein said multifunctional amine has at least one unhindered alkyl primary amine.

6. A composite as in claim 1 produced by a process involving pretreating the substrate surface with a multifunctional amine to form a pretreated substrate surface, heating the substrate to a temperature sufficient to induce a reaction between said multifunctional amine and said substrate surface to form a functionalized substrate surface, and reacting said functionalized substrate surface with an epoxy resin.

* * * * *